(12) United States Patent
Wilson et al.

(10) Patent No.: US 11,435,138 B2
(45) Date of Patent: Sep. 6, 2022

(54) HEAT EXCHANGER FOR A LIQUEFIED NATURAL GAS FACILITY

(71) Applicant: CONOCOPHILLIPS COMPANY, Houston, TX (US)

(72) Inventors: Stuart L. Wilson, Houston, TX (US); Wesley R. Qualls, Houston, TX (US); Matthew C. Gentry, Houston, TX (US); Paula A. Leger, Houston, TX (US); Robert L. Boulanger, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 384 days.

(21) Appl. No.: 14/633,307

(22) Filed: Feb. 27, 2015

(65) Prior Publication Data
US 2015/0253071 A1 Sep. 10, 2015

Related U.S. Application Data

(60) Provisional application No. 61/947,797, filed on Mar. 4, 2014.

(51) Int. Cl.
*F25J 3/02* (2006.01)
*F28F 21/08* (2006.01)
(Continued)

(52) U.S. Cl.
CPC ........... *F25J 1/0022* (2013.01); *B23K 20/002* (2013.01); *B23K 20/023* (2013.01);
(Continued)

(58) Field of Classification Search
CPC .......... F28F 3/08; F28F 21/081; F28F 21/087; B23K 2203/02; B23K 2203/26;
(Continued)

(56) References Cited

U.S. PATENT DOCUMENTS 2,246,551 A   6/1941  Stickel
3,053,511 A *  9/1962  Godfrey ................. B32B 15/01
                                                  165/133

(Continued)

FOREIGN PATENT DOCUMENTS

DE     2435284 A1    2/1976
EP     0676604 A1    10/1995
(Continued)

OTHER PUBLICATIONS

International Search Report. PCT/US15/17951 dated Jul. 6, 2015.
(Continued)

*Primary Examiner* — Frantz F Jules
*Assistant Examiner* — Webeshet Mengesha
(74) *Attorney, Agent, or Firm* — Polsinelli PC

(57) ABSTRACT

A method of constructing a plate fin heat exchanger includes joining a first side bar formed from a nickel-iron alloy to a first end of a fin element formed from a nickel-iron alloy through a first nickel-iron alloy bond, and joining a second side bar formed from a nickel-iron alloy to a second end of the fin element through a second nickel-iron alloy bond to create a first layer of the plate fin heat exchanger. The fin element defines a fluid passage.

20 Claims, 8 Drawing Sheets

(51) Int. Cl.
*F25J 1/00* (2006.01)
*B23K 20/00* (2006.01)
*B23K 20/233* (2006.01)
*B23K 20/02* (2006.01)
*F25J 5/00* (2006.01)
*F25J 1/02* (2006.01)
*F28D 21/00* (2006.01)
*F28D 9/00* (2006.01)
*F28D 7/00* (2006.01)
*F28D 7/06* (2006.01)
*B23K 101/14* (2006.01)
*B23K 103/18* (2006.01)
*B23K 103/02* (2006.01)

(52) U.S. Cl.
CPC ............ *B23K 20/233* (2013.01); *F25J 1/004* (2013.01); *F25J 1/0035* (2013.01); *F25J 1/0052* (2013.01); *F25J 1/0085* (2013.01); *F25J 1/0087* (2013.01); *F25J 1/021* (2013.01); *F25J 1/0263* (2013.01); *F25J 1/0264* (2013.01); *F25J 3/0209* (2013.01); *F25J 3/0233* (2013.01); *F25J 3/0238* (2013.01); *F25J 5/002* (2013.01); *F25J 5/005* (2013.01); *F28D 7/0083* (2013.01); *F28D 7/06* (2013.01); *F28D 9/0006* (2013.01); *F28D 9/0062* (2013.01); *F28D 21/0017* (2013.01); *F28F 21/082* (2013.01); *F28F 21/087* (2013.01); *B23K 2101/14* (2018.08); *B23K 2103/02* (2018.08); *B23K 2103/26* (2018.08); *F25J 2200/04* (2013.01); *F25J 2200/40* (2013.01); *F25J 2200/70* (2013.01); *F25J 2200/74* (2013.01); *F25J 2200/78* (2013.01); *F25J 2205/02* (2013.01); *F25J 2205/04* (2013.01); *F25J 2210/06* (2013.01); *F25J 2220/60* (2013.01); *F25J 2240/02* (2013.01); *F25J 2250/02* (2013.01); *F25J 2290/44* (2013.01); *F28D 2021/0033* (2013.01); *Y02P 80/10* (2015.11)

(58) Field of Classification Search
CPC .. B23K 2201/14; F28D 9/0006; F25J 1/0022; F25J 1/004; F25J 1/0085; F25J 1/0052; F25J 1/0263; F25J 1/021; F25J 1/0087; F25J 1/0264; F25J 1/0035; F25J 3/02; F25J 3/0233; F25J 3/0209; F25J 3/0238; F25J 3/04078; F25J 3/04781
See application file for complete search history.

(56) References Cited

U.S. PATENT DOCUMENTS

| | | | | |
|---|---|---|---|---|
| 3,919,073 | A * | 11/1975 | Bagnoli | C10G 9/203 208/47 |
| 3,983,191 | A * | 9/1976 | Schauls | F25J 5/002 165/166 |
| 4,699,209 | A | 10/1987 | Thorogood | |
| 5,402,645 | A * | 4/1995 | Johnson | C10G 5/06 62/619 |
| 5,651,270 | A | 7/1997 | Low et al. | |
| 5,989,506 | A | 11/1999 | Markovs | |
| 8,889,066 | B2 * | 11/2014 | Hoberg | B23K 35/3066 219/121.46 |
| 2004/0055329 | A1 * | 3/2004 | Mathias | F25J 1/0022 62/611 |
| 2004/0072013 | A1 * | 4/2004 | Tada | F28F 21/087 428/680 |
| 2004/0228781 | A1 * | 11/2004 | Tonkovich | B01D 53/0446 422/222 |
| 2006/0166028 | A1 * | 7/2006 | Sagawa | B23K 35/0238 428/619 |
| 2014/0150992 | A1 * | 6/2014 | Koontz | F28F 7/02 165/80.1 |

FOREIGN PATENT DOCUMENTS

| | | |
|---|---|---|
| EP | 1008828 A1 | 6/2000 |
| EP | 1154218 A1 | 11/2001 |
| EP | 1364740 A1 | 11/2003 |
| GB | 850738 A | 10/1960 |
| GB | 2048567 A | 12/1980 |
| GB | 2451848 A | 2/2009 |
| WO | WO-2007022740 A1 | 3/2007 |
| WO | WO-2012077143 A1 | 6/2012 |

OTHER PUBLICATIONS (Li, Q et al.) Compact Heat Exchangers; A Review and Future Applications for a New Generation of High Temperature Solar Receivers. Renewable and Sustainable Energy Reviews. vol. 15.Sep. 15, 2011. pp. 4855-4875; pp. 858-4860; figure 3.

* cited by examiner

HEAT EXCHANGER FOR A LIQUEFIED NATURAL GAS FACILITY

CROSS-REFERENCE TO RELATED APPLICATIONS

This application claims priority benefit under 35 U.S.C. Section 119(e) to U.S. Provisional Patent Ser. No. 61/947,797 filed on Mar. 4, 2014 the entire disclosure of which is incorporated herein.

FIELD OF THE INVENTION

This invention relates to systems and processes for liquefying natural gas. In another aspect, the invention concerns LNG processes and facilities employing a heavies removal system. In another aspect, the invention concerns heat integrating feed and compressor discharge streams with a heavies removal system in an LNG facility.

BACKGROUND OF THE INVENTION

Cryogenic liquefaction is commonly used to convert natural gas into a more convenient form for transportation and/or storage. Because liquefying natural gas greatly reduces its specific volume, large quantities of natural gas can be economically transported and/or stored in liquefied form.

Transporting natural gas in its liquefied form can effectively link a natural gas source with a distant market when the source and market are not connected by a pipeline. This situation commonly arises when the source of natural gas and the market for the natural gas are separated by large bodies of water. In such cases, liquefied natural gas (LNG) can be transported from the source to the market using specially designed ocean-going LNG tankers.

Storing natural gas in its liquefied form can help balance periodic fluctuations in natural gas supply and demand. In particular, LNG can be "stockpiled" for use when natural gas demand is low and/or supply is high. As a result, future demand peaks can be met with LNG from storage, which can be vaporized as demand requires.

Several methods exist for liquefying natural gas. Some methods produce a pressurized LNG (PLNG) product that is useful, but requires expensive pressure-containing vessels for storage and transportation. Other methods produce an LNG product having a pressure at or near atmospheric pressure. In general, these non-pressurized LNG production methods involve cooling a natural gas stream through indirect heat exchange with one or more refrigerants and then expanding the cooled natural gas stream to near atmospheric pressure. In addition, most LNG facilities employ one or more systems to remove contaminants (e.g., water, mercury and mercury components, acid gases, and nitrogen, as well as a portion of ethane and heavier components) from the natural gas stream at different points during the liquefaction process.

In general, LNG facilities are designed and operated to provide LNG to a single market in a specific region of the world. Because specifications for the final characteristics of the natural gas product, such as, for example, higher heating value (HHV), Wobbe index, methane content, ethane content, $C_3+$ content, and inerts content vary widely throughout the world, LNG facilities are typically optimized to meet a certain set of specifications for a single market. In large part, achieving the stringent final product specifications involves effectively removing certain components from the natural gas feed stream. LNG facilities may employ one or more distillation columns to remove these components from the incoming natural gas stream. Oftentimes, the heavies removal system is configured in a two column arrangement utilizing a high pressure demethanizer followed by a lower downstream column. In addition, at least one of the columns used to separate the heavier components from the natural gas stream can generally be operated at or near the critical pressure of the components being separated. These limitations, coupled with rigid product specifications, results in distillation columns that are typically designed to operate within a relatively narrow range of conditions. When situations arise that force the columns out of design range (e.g., start-up of the facility or fluctuations in feed composition), the resulting column operation may result in product loss and/or a LNG product that does not meet the desired product specifications.

Gas treatment facilities, such as systems that process cryogenic gases, liquids, and/or two-phase mixtures including, but not limited to, liquid natural gas (LNG), employ heat exchangers to condition various fluid flows. One or more fluid streams (which may or may not include different types of fluids) are passed through layers each having fins that extend between side bars. Adjacent process layers are separated by a parting sheet. One or more hot process fluids are passed over the fins to simultaneously exchange heat with one or more cold process fluid streams. The one or more fluid streams exchange heat to achieve a desired temperature. Currently, plate fin heat exchangers are constructed using aluminum. Aluminum is a relatively light weight material and possesses desirable heat exchange properties. However, aluminum possesses very poor mechanical strength and fatigue-resistance properties. In plate fin heat exchangers constructed using aluminum, components are typically joined through brazed joints and/or connections.

SUMMARY OF THE INVENTION

In accordance with an exemplary embodiment, a method of constructing a plate fin heat exchanger includes joining a first side bar formed from a nickel-iron alloy to a first end of a fin element formed from a nickel-iron alloy through a first nickel-iron alloy bond, and joining a second side bar formed from a nickel-iron alloy to a second end of the fin element through a second nickel-iron alloy bond to create a first layer of the plate fin heat exchanger. The fin element defines a fluid passage.

In accordance with an aspect of an exemplary embodiment, a cryogenic gas processing system includes a chiller, and a low temperature separator (LTS) including an inlet fluidically connected to the chiller, a first outlet and a second outlet. A flash drum includes an inlet fluidically connected to the LTS and a plurality of outlets. A heat exchanger is fluidically connected to the second outlet of the LTS and the plurality of outlets of the flash drum. The heat exchanger includes a first side bar formed from a nickel-iron alloy and a second side bar formed from a nickel-iron alloy. The second side bar is spaced from the first side bar. A fin element formed from a nickel-iron alloy extends between the first side bar and the second side bar forming a first layer of the heat exchanger. The fin element includes an inner passage and is formed from a nickel-iron alloy. A first nickel-iron alloy bond joins the fin element and the first side bar, and a second nickel-iron alloy bond joins the fin element and the second side bar.

In accordance with another aspect of an exemplary embodiment, a heat exchanger includes a first side bar formed from a nickel-iron alloy and a second side bar formed from a nickel-iron alloy. The second side bar is spaced from the first side bar. A fin element formed from a nickel-iron alloy extends between the first side bar and the second side bar forming a first layer of the heat exchanger. The fin element includes an inner passage and is formed from a nickel-iron alloy. A first nickel-iron alloy bond joins the fin element and the first side bar, and a second nickel-iron alloy bond joins the fin element and the second side bar.

A hybrid core-in-shell heat exchanger includes a vessel having an interior portion configured to receive a refrigerant. A first exchanger having a first exchanger configuration is arranged in the interior portion. A second exchanger having a second exchanger configuration is arranged in the interior portion and is fluidically isolated from the first exchanger, the second exchanger configuration being distinct from the first exchanger configuration.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

The present invention can be implemented in a facility used to cool natural gas to its liquefaction temperature to thereby produce liquefied natural gas (LNG). The LNG facility generally employs one or more refrigerants to extract heat from the natural gas and reject the environment. Numerous configurations of LNG systems exist and the present invention may be implemented in many different types of LNG systems.

In one embodiment, the present invention can be implemented in a mixed refrigerant LNG system. Examples of mixed refrigerant processes can include, but are not limited to, a single refrigeration system using a mixed refrigerant, a propane pre-cooled mixed refrigerant system, and a dual mixed refrigerant system.

In another embodiment, the present invention is implemented in a cascade LNG system employing a cascade-type refrigeration process using one or more predominately pure component refrigerants. The refrigerants utilized in cascade-type refrigeration processes can have successively lower boiling points in order to facilitate heat removal from the natural gas stream being liquefied. Additionally, cascade-type refrigeration processes can include some level of heat integration. For example, a cascade-type refrigeration process can cool one or more refrigerants having a higher volatility through indirect heat exchange with one or more refrigerants having a lower volatility. In addition to cooling the natural gas stream through indirect heat exchange with one or more refrigerants, cascade and mixed-refrigerant LNG systems can employ one or more expansion cooling stages to simultaneously cool the LNG while reducing its pressure.

Figure 1:
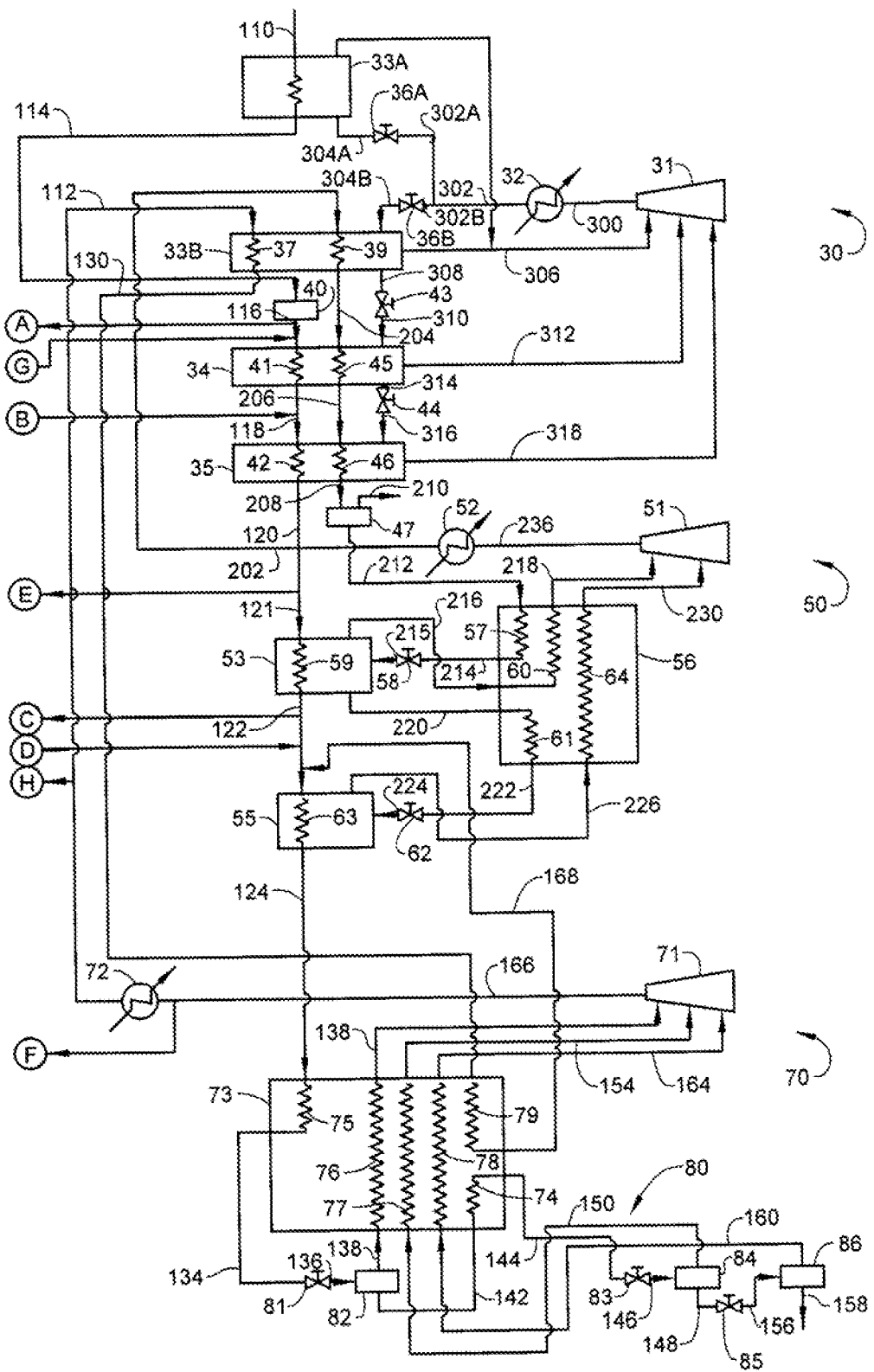
FIG. 1 is a simplified overview of a cascade-type LNG facility configured in accordance with one embodiment of the present invention.
Figure 2:
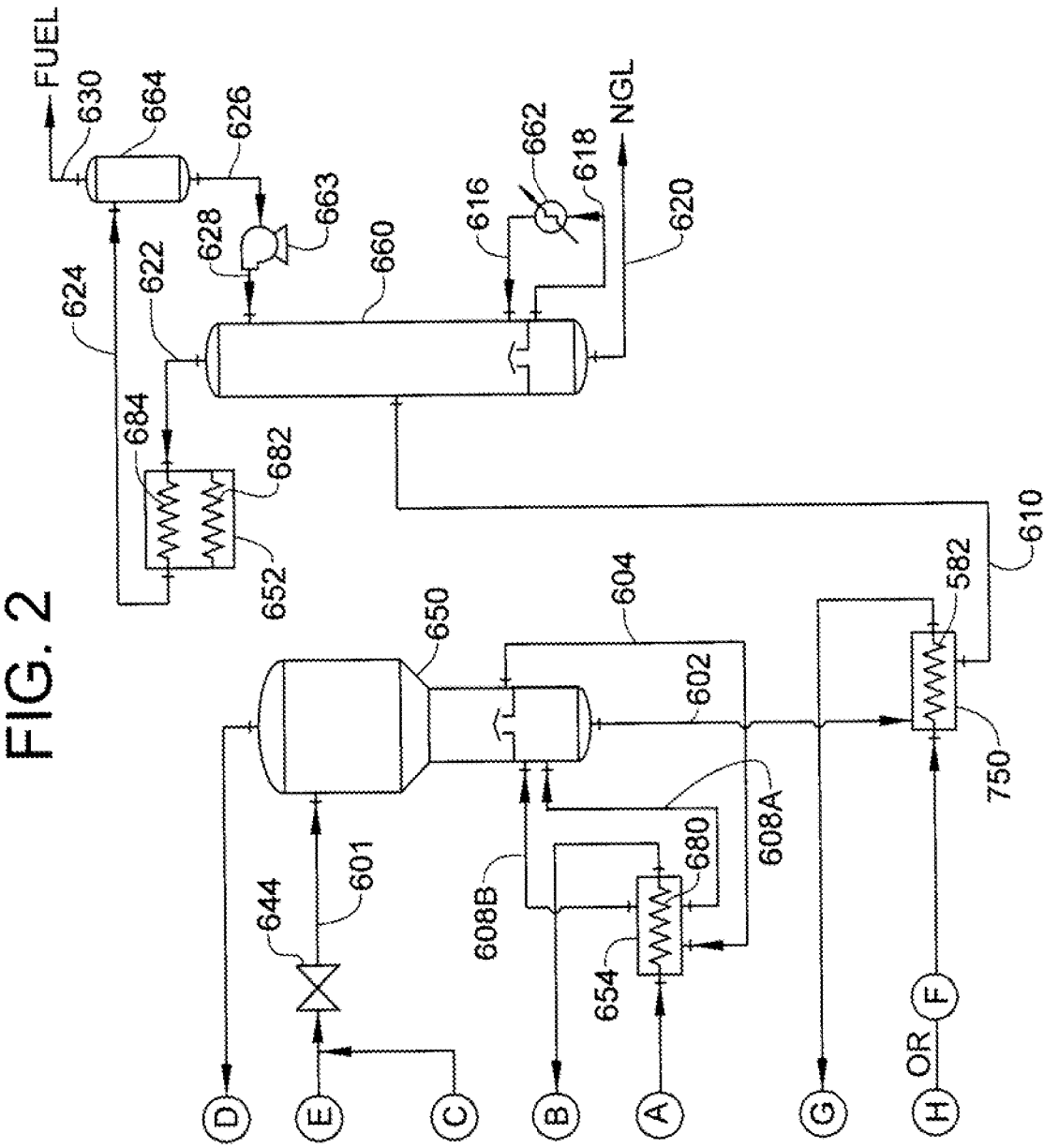
FIG. 2 is a schematic diagram of a cascade-type LNG facility configured in accordance with one embodiment of present invention with certain portions of the LNG facility connecting to lines A, B, C, D, E and/or F being illustrated in FIG. 1.
Figure 3:
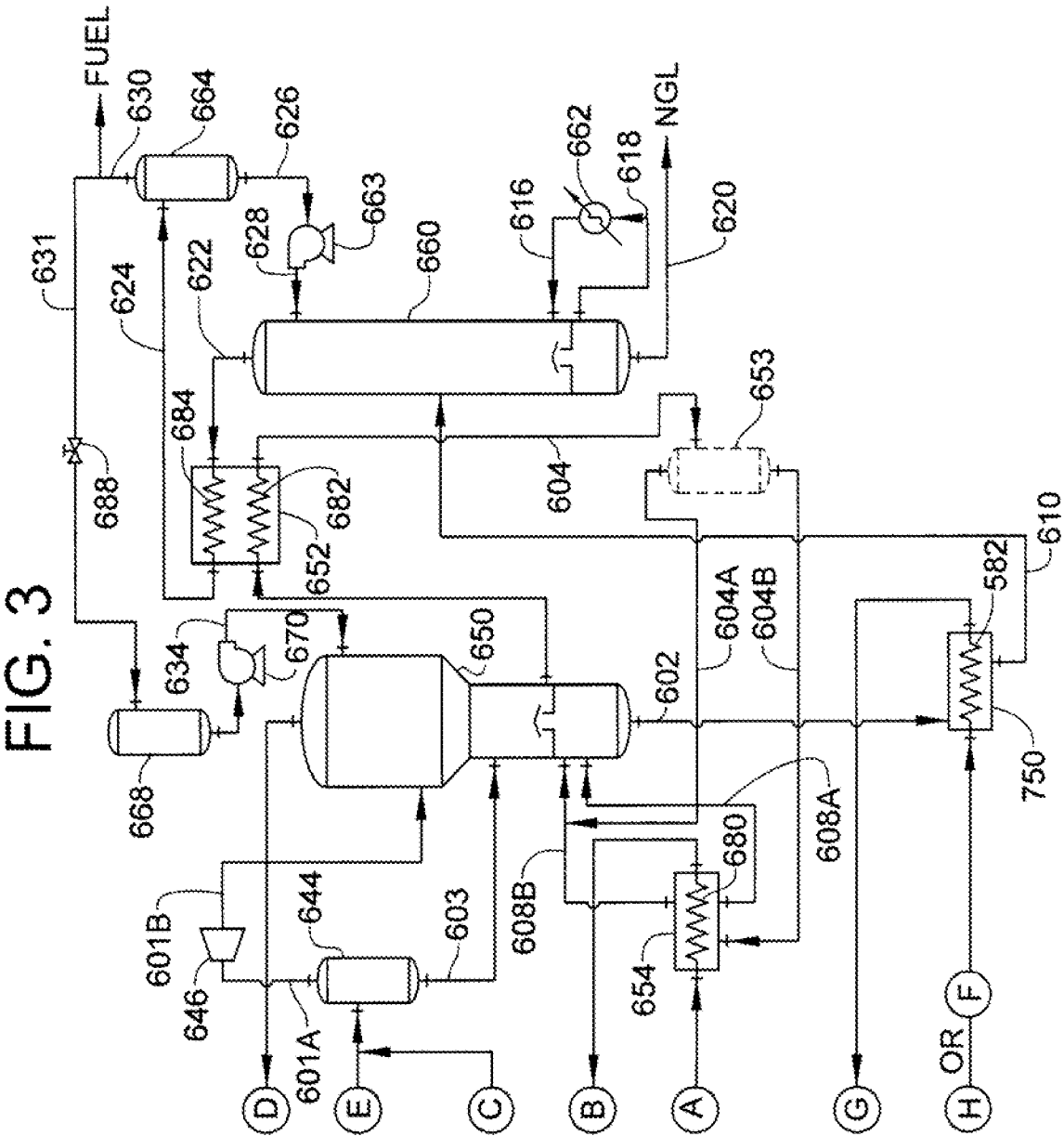
FIG. 3 is a schematic diagram illustrating one embodiment of a heavies removal zone integrated into the LNG facility of FIG. 1 through lines A, B, C, D, E and/or F.

Referring now to FIG. 1, one embodiment of a cascade-type LNG facility, in accordance with one embodiment of the present invention, is illustrated. The LNG facility depicted in FIG. 1 generally comprises a propane refrigeration cycle 30, an ethylene refrigeration cycle 50, and a methane refrigeration cycle 70 with an expansion section 80. FIGS. 2 and 3 illustrate embodiments of heavies removal zones capable of being integrated into the LNG facility depicted in FIG. 1. While "propane", "ethylene", and "methane" are used to refer to respective first, second, and third refrigerants, it should be understood that the embodiment illustrated in FIG. 1 and described herein can apply to any combination of suitable refrigerants. The main components of propane refrigeration cycle 30 include a propane compressor 31, a propane cooler/condenser 32, high-stage propane chillers 33A and 33B, an intermediate-stage propane chiller 34, and a low-stage propane chiller 35. The main components of ethylene refrigeration cycle 50 include an ethylene compressor 51, an ethylene cooler 52, a high-stage ethylene chiller 53, a low-stage ethylene chiller/condenser 55, and an ethylene economizer 56. The main components of methane refrigeration cycle 70 include a methane compressor 71, a methane cooler 72, and a methane economizer 73. The main components of expansion section 80 include a high-stage methane expansion valve and/or expander 81, a high-stage methane flash drum 82, an intermediate-stage methane expansion valve and/or expander 83, an intermediate-stage methane flash drum 84, a low-stage methane expansion valve and/or expander 85, and a low-stage methane flash drum 86. FIGS. 2 and 3 present embodiments of a heavies removal zone that is integrated into the LNG facility depicted in FIG. 1 through lines A-F.

The operation of the LNG facility illustrated in FIG. 1 will now be described in more detail, beginning with propane refrigeration cycle 30. Propane is compressed in multi-stage (e.g., three-stage) propane compressor 31 driven by, for example, a gas turbine driver (not illustrated). The stages of compression may exist in a single unit or two or more separate units mechanically coupled to a single driver. Upon compression, the propane is passed through conduit 300 to propane cooler 32, wherein it is cooled and liquefied through indirect heat exchange with an external fluid (e.g., air or water). The stream from propane cooler 32 can then be passed through conduit 302 to a pressure reduction means, illustrated as expansion valve 36A, wherein the pressure of the liquefied propane is reduced, thereby evaporating or flashing a portion thereof. The resulting two-phase stream then flows through conduit 304a into high-stage propane chiller 33a. High stage propane chiller 33a uses the flashed propane refrigerant to cool the incoming natural gas stream in conduit 110.

The cooled natural gas stream from high-stage propane chiller 33a flows through conduit 114 to a separation vessel (not shown), wherein water and, in some cases, propane and heavier components are removed, typically followed by a treatment system 40, when not already completed in upstream processing, wherein moisture, mercury and mercury compounds, particulates, and other contaminants are removed to create a treated stream. The stream exits the treatment system 40 through conduit 116. Thereafter, a portion of the stream in conduit 116 can be routed through conduit A to a heavies removal zone illustrated in FIG. 2 or 3, which will be discussed in detail shortly. The remaining portion of the stream in conduit 116 is combined with a yet-to-be discussed stream in conduit G exiting the heavies removal zone illustrated. The combined stream can then enter intermediate-stage propane chiller 34, wherein the stream is cooled in indirect heat exchange means 41 through indirect heat exchange with a yet-to-be-discussed propane refrigerant stream. The resulting cooled stream in conduit 118 can then be recombined with a yet-to-be-discussed stream in conduit B exiting heavies removal zone illustrated in FIG. 2 or 3, and the combined stream can then be routed to low-stage propane chiller 35, wherein the stream can be further cooled through indirect heat exchange means 42. The resulting cooled stream can then exit low-stage propane chiller 35 through conduit 120. Subsequently, the cooled stream in conduit 120 can be routed to high-stage ethylene chiller 53, which will be discussed in more detail shortly.

The combined vaporized propane refrigerant stream exiting high-stage propane chillers 33A and 33B is returned to the high-stage inlet port (not separately labeled) of propane compressor 31 through conduit 306. The liquid propane refrigerant in high-stage propane chiller 33A provides refrigeration duty for the natural gas stream. Two-phase refrigerant stream can enter the intermediate-stage propane chiller 34 through conduit 310, thereby providing coolant for the natural gas stream (in conduit 116) and to yet-to-be-discussed streams entering intermediate-stage propane chiller 34 through conduits 204 and 310. The vaporized portion of the propane refrigerant exits intermediate-stage propane chiller 34 through conduit 312 and can then enter the intermediate-stage inlet port (not separately labeled) of propane compressor 31. The liquefied portion of the propane refrigerant exits intermediate-stage propane chiller 34 through conduit 314 and is passed through a pressure-reduction means, illustrated here as expansion valve 44, whereupon the pressure of the liquefied propane refrigerant is reduced to thereby flash or vaporize a portion thereof. The resulting vapor-liquid refrigerant stream can then be routed to low-stage propane chiller 35 through conduit 316 and where the refrigerant stream can cool the methane-rich stream and a yet-to-be-discussed ethylene refrigerant stream entering low-stage propane chiller 35 through conduits 118 and 206, respectively. The vaporized propane refrigerant stream then exits low-stage propane chiller 35 and is routed to the low-stage inlet port of propane compressor 31 through conduit 318 wherein it is compressed and recycled as previously described.

As shown in FIG. 1, a stream of ethylene refrigerant in conduit 202 enters high-stage propane chiller 33b, wherein the ethylene stream is cooled through indirect heat exchange means 39. The resulting cooled ethylene stream can then be routed in conduit 204 from high-stage propane chiller 33b to intermediate-stage propane chiller 34. Upon entering intermediate-stage propane chiller 34, the ethylene refrigerant stream can be further cooled through indirect heat exchange means 45 in intermediate-stage propane chiller 34. The resulting cooled ethylene stream can then exit intermediate-stage propane chiller 34 and can be routed through conduit 206 to enter low-stage propane chiller 35. In low-stage propane chiller 35, the ethylene refrigerant stream can be at least partially condensed, or condensed in its entirety, through indirect heat exchange means 46. The resulting stream exits low-stage propane chiller 35 through conduit 208 and can subsequently be routed to a separation vessel 47, wherein a vapor portion of the stream, if present, can be removed through conduit 210, while a liquid portion of the ethylene refrigerant stream can exit separation vessel 47 through conduit 212. The liquid portion of the ethylene refrigerant stream exiting separation vessel 47 can have a representative temperature and pressure of about −24° F. (about −31° C.) and about 285 psia (about 1,965 kPa).

Turning now to ethylene refrigeration cycle 50 in FIG. 1, the liquefied ethylene refrigerant stream in conduit 212 can enter ethylene economizer 56, wherein the stream can be further cooled by an indirect heat exchange means 57. The resulting cooled liquid ethylene stream in conduit 214 can then be routed through a pressure reduction means, illustrated here as expansion valve 58, whereupon the pressure of the cooled predominantly liquid ethylene stream is reduced to thereby flash or vaporize a portion thereof. The cooled, two-phase stream in conduit 215 can then enter high-stage ethylene chiller 53. In high-stage ethylene chiller 53, at least a portion of the ethylene refrigerant stream can vaporize to further cool the stream in conduit 121 entering an indirect heat exchange means 59. The vaporized and remaining liquefied ethylene refrigerant exits high-stage ethylene chiller 53 through respective conduits 216 and 220. The vaporized ethylene refrigerant in conduit 216 can re-enter ethylene economizer 56, wherein the stream can be warmed through an indirect heat exchange means 60 prior to entering the high-stage inlet port of ethylene compressor 51 through conduit 218, as shown in FIG. 1.

The cooled stream in conduit 120 exiting low-stage propane chiller 35 can thereafter be split into two portions, as shown in FIG. 1. At least a portion of the natural gas stream can be routed through conduit E. While the remaining portion of the cooled natural gas stream in conduit 121 can be routed to high-stage ethylene chiller 53, and then can be and cooled in indirect heat exchange means 59 of high-stage ethylene chiller 53.

The remaining liquefied ethylene refrigerant exiting high-stage ethylene chiller 53 in conduit 220 can re-enter ethylene economizer 56, to be further sub-cooled by an indirect heat exchange means 61 in ethylene economizer 56. The resulting sub-cooled refrigerant stream exits ethylene economizer 56 through conduit 222 and can subsequently be routed to a pressure reduction means, illustrated here as expansion valve 62, whereupon the pressure of the refrigerant stream is reduced to thereby vaporize or flash a portion thereof. The resulting, cooled two-phase stream in conduit 224 enters low-stage ethylene chiller/condenser 55.

As shown in FIG. 1, a portion of the cooled natural gas stream exiting high-stage ethylene chiller 53 can be routed through conduit C to the heavies removal zone in FIG. 2 or 3 through conduit C, while another portion of the cooled natural gas stream exiting high-stage ethylene chiller 53 can be routed through conduit 122 to enter indirect heat exchange means 63 of low-stage ethylene chiller/condenser 55. The remaining portion of the cooled natural gas stream in conduit 122 can then be combined in the first column vapor stream exiting the heavies removal zone (e.g. first column vapor stream exiting the first distillation column 650 in FIG. 2 or 3 through the overheat outlet) in conduit D and/or may be combined with a yet-to-be-discussed stream exiting methane refrigeration cycle 70 in conduit 168, for the resulting composite stream to then enter indirect heat exchange means 63 in low-stage ethylene chiller/condenser 55, as shown in FIG. 1.

In low-stage ethylene chiller/condenser 55, the cooled stream (which can comprise the stream in conduit 122 optionally combined with streams in conduits D and 168) can be at least partially condensed through indirect heat exchange with the ethylene refrigerant entering low-stage ethylene chiller/condenser 55 through conduit 224. The vaporized ethylene refrigerant exits low-stage ethylene chiller/condenser 55 through conduit 226 and can then enter ethylene economizer 56. In ethylene economizer 56, the vaporized ethylene refrigerant stream can be warmed through an indirect heat exchange means 64 prior to being fed into the low-stage inlet port of ethylene compressor 51 through conduit 230. As shown in FIG. 1, a stream of compressed ethylene refrigerant exits ethylene compressor 51 through conduit 236 and can subsequently be routed to ethylene cooler 52, wherein the compressed ethylene stream can be cooled through indirect heat exchange with an external fluid (e.g., water or air). The resulting cooled ethylene stream can then be introduced through conduit 202 into high-stage propane chiller 33B for additional cooling as previously described.

The cooled natural gas stream exiting low-stage ethylene chiller/condenser 55 in conduit 124 can also be referred to as the "pressurized LNG-bearing stream". As shown in FIG. 1, the pressurized LNG-bearing stream exits low-stage ethylene chiller/condenser 55 through conduit 124 prior to entering main methane economizer 73. In main methane economizer 73, the methane-rich stream in conduit 124 can be cooled in an indirect heat exchange means 75 through indirect heat exchange with one or more yet-to-be discussed methane refrigerant streams. The cooled, pressurized LNG-bearing stream exits main methane economizer 73 through conduit 134 and can then be routed into expansion section 80 of methane refrigeration cycle 70. In expansion section 80, the pressurized LNG-bearing stream first passes through high-stage methane expansion valve 81 and/or expander, whereupon the pressure of this stream is reduced to thereby vaporize or flash a portion thereof. The resulting two-phase methane-rich stream in conduit 136 can then enter high-stage methane flash drum 82, whereupon the vapor and liquid portions of the reduced-pressure stream can be separated. The vapor portion of the reduced-pressure stream (also called the high-stage flash gas) exits high-stage methane flash drum 82 through conduit 138 to then enter main methane economizer 73, wherein at least a portion of the high-stage flash gas can be heated through indirect heat exchange means 76 of main methane economizer 73. The resulting warmed vapor stream exits main methane economizer 73 through conduit 138 and can then be routed to the high-stage inlet port of methane compressor 71, as shown in FIG. 1.

The liquid portion of the reduced-pressure stream exits high-stage methane flash drum 82 through conduit 142 to then re-enter main methane economizer 73, wherein the liquid stream can be cooled through indirect heat exchange means 74 of main methane economizer 73. The resulting cooled stream exits main methane economizer 73 through conduit 144 and can then be routed to a second expansion stage, illustrated here as intermediate-stage expansion valve 83, but could include an expander. Intermediate-stage expansion valve 83 further reduces the pressure of the cooled methane stream which reduces the stream's temperature by vaporizing or flashing a portion thereof. The resulting two-phase methane-rich stream in conduit 146 can then enter intermediate-stage methane flash drum 84, wherein the liquid and vapor portions of this stream can be separated and can exit the intermediate-stage flash drum 84 through respective conduits 148 and 150. The vapor portion (also called the intermediate-stage flash gas) in conduit 150 can re-enter methane economizer 73, wherein the vapor portion can be heated through an indirect heat exchange means 77 of main methane economizer 73. The resulting warmed stream can then be routed through conduit 154 to the intermediate-stage inlet port of methane compressor 71, as shown in FIG. 1.

The liquid stream exiting intermediate-stage methane flash drum 84 through conduit 148 can then pass through a low-stage expansion valve 85 and/or expander, whereupon the pressure of the liquefied methane-rich stream can be further reduced to thereby vaporize or flash a portion thereof. The resulting cooled, two-phase stream in conduit 156 can then enter low-stage methane flash drum 86, wherein the vapor and liquid phases can be separated. The liquid stream exiting low-stage methane flash drum 86 through conduit 158 can comprise the liquefied natural gas (LNG) product. The LNG product, which is at about atmospheric pressure, can be routed through conduit 158 downstream for subsequent storage, transportation, and/or use.

The vapor stream exiting low-stage methane flash drum (also called the low-stage methane flash gas) in conduit 160 can be routed to methane economizer 73, wherein the low-stage methane flash gas can be warmed through an indirect heat exchange means 78 of main methane economizer 73. The resulting stream can exit methane economizer 73 through conduit 164, whereafter the stream can be routed to the low-stage inlet port of methane compressor 71.

Methane compressor 71 can comprise one or more compression stages. In one embodiment, methane compressor 71 comprises three compression stages in a single module. In another embodiment, one or more of the compression modules can be separate, but can be mechanically coupled to a common driver. Generally, one or more intercoolers (not shown) can be provided between subsequent compression stages.

As shown in FIG. 1, the compressed methane refrigerant stream exiting methane compressor 71 can be discharged into conduit 166. A portion of the compressed methane refrigerant stream exiting compressor 71 through conduit 166 can be routed through conduit F to the heavies removal zones in FIGS. 2 and 3 through conduit F, while another portion of the compressed methane refrigerant can be routed to methane cooler 72, whereafter the stream can be cooled through indirect heat exchange with an external fluid (e.g., air or water) in methane cooler 72. The resulting cooled methane refrigerant stream exits methane cooler 72 through conduit 112, whereafter a portion of the methane refrigerant can be routed through conduit H to the heavies removal zones in FIG. 2, while the remaining portion of the methane refrigerant stream can be directed to and further cooled in propane refrigeration cycle 30.

Upon being cooled in propane refrigeration cycle 30 through heat exchanger means 37, the methane refrigerant stream can be discharged into conduit 130 and subsequently routed to main methane economizer 73, wherein the stream can be further cooled through indirect heat exchange means 79. The resulting sub-cooled stream exits main methane economizer 73 through conduit 168 and can then combined with stream in conduit 122 exiting high-stage ethylene chiller 53 and/or with stream in conduit D exiting the heavies removal zone (e.g. first predominately vapor stream from first distillation column 650 in FIGS. 2-3) prior to entering low-stage ethylene chiller/condenser 55, as previously discussed.

Turning now to FIG. 2, one embodiment of a heavies removal zone suitable for integration with the LNG facility depicted in FIG. 1 is illustrated. The heavies removal zone depicted in FIG. 2 generally comprises: a first distillation column 650, a first heat exchanger or reboiler 654, a valve 644 and/or an expander, a second heat exchanger 750, a second distillation column 660, and a third heat exchanger 652. The streams exiting the LNG facility depicted in FIG. 1 and routed to the heavies removal zone are dependent upon the operating conditions of the heavies removal zone, i.e., the temperature, pressure, etc. Likewise, upon exiting the heavies removal zone several streams are reintroduced into the LNG facility depicted in FIG. 1 at an appropriate stage in the process to facilitate thermal design and not to damage the equipment. In one embodiment, the streams returning to the LNG facility depicted in FIG. 1 are reintroduced through manual or automated sequencing valves to thereby deliver the incoming fluid to the appropriate stages within the equipment limitations.

In an embodiment as shown in FIG. 1, a cooled natural gas stream exiting downstream of the high-stage ethylene chiller 53 through conduit C is combined with a predominantly vapor stream exiting downstream of low-stage propane chiller 35 through conduit E in FIG. 1 (a portion of a natural gas stream) and enters the heavies removal zones shown in FIGS. 2 and 3. In FIG. 2, the combined stream in conduits C and E enter a control valve 644 and/or an expander and is subsequently introduced directly into first distillation column 650 through conduit 601. The control valve adjusts pressure or flow. In an embodiment, an analyzer (not shown) monitors and controls the temperature of the incoming combined D and E streams and adjusts the relative stream flow rates to thereby adjust the first distillation column inlet temperature as necessary to help control the desired separation.

Referring to FIG. 2, the first distillation column 650 separates the incoming streams producing a first column vapor stream, a first column liquid bottoms stream and a reboiler cold side inlet stream. The first distillation column contains a chimney or trap-out tray (not shown), wherein lighter composition streams are directed to the upper regions of the distillation column while heavier composition streams are routed to the lower portions of the distillation column. A first column vapor stream can be withdrawn from an overhead vapor outlet of first distillation column and thereafter be routed through conduit D to the liquefaction process of the LNG facility depicted in FIG. 1. The first column liquid bottoms stream can be withdrawn from a bottom outlet of first distillation column 650 and can thereafter be routed through conduit 602 to a second heat exchanger 750, discussed below. The reboiler inlet stream exits the distillation column at the chimney or trap-out tray and is routed through conduit 604 to the first reboiler 654, discussed below.

Referring now to FIG. 2, at least a portion of the natural gas stream withdrawn from conduit 116 in FIG. 1 can be routed to the heavies removal zones depicted in FIG. 2 through conduit A. In an embodiment, the at least a portion of the natural gas stream withdrawn from conduit 116 in FIG. 1 is a treated natural gas feed stream. As shown in FIG. 2, the stream in conduit A can enter the warm fluid inlet of first reboiler 654 to form a heating pass 680 and thereby provide reboiler heat duty to the first distillation column 650. The portion of the natural gas stream provides heat duty to at least a portion of the reboiler cold side inlet stream to thereby produce, in a cooled and in some cases a partially condensed portion of the natural gas stream, a first heated liquid fraction 608(*a*) and a first heated vapor fraction 608(*b*). The cooled and/or partially condensed portion of the natural gas stream is withdrawn from the warm side outlet of the first reboiler 654 and can subsequently be routed back into the LNG facility through conduit B. In an embodiment the flow of treated natural gas supplied to the warm side inlet may be adjusted to control temperature at an optimal location on the first distillation column or peripheral equipment piping.

As shown in FIG. 1, a portion of the natural gas stream exiting a high stage methane compressor through conduit 166 can be withdrawn through conduits H or F and can be routed to the heavies removal zones depicted in FIG. 2 or 3. In an embodiment, the portion of the natural gas stream in conduits H or F in FIG. 1 is a methane compressor discharge stream. As shown in FIG. 2, the portion of the natural gas stream in conduits H or F can enter the warm fluid inlet of a cooling pass 582 of second heat exchanger 750 to thereby provide heat duty to the second heat exchanger 750. The portion of the natural gas stream along with a portion of the first column liquid bottoms stream undergo indirect heat exchange to thereby produce a cooled portion of the natural gas stream and a second heated stream. The resulting cooled portion of the natural gas stream withdrawn from the warm side outlet of the second heat exchanger 750 can subsequently be routed back to the LNG facility through conduit G. The second heated stream withdrawn from the second heat exchanger 750 through conduit 610 can be introduced into a feed inlet of second distillation column 660. In one embodiment, the second heat exchanger 750 is used as an LNG stabilizer feed heater with the warm side fluid inlet flow rate through conduit H or F or warm side fluid outlet flow rate through conduit G controlled to produce an optimal second distillation column feed temperature.

The second distillation column 660 separates the incoming streams. A second column overhead vapor stream (also called "second overhead stream") is withdrawn through conduit 622 from second distillation column 660. A portion of the second column overhead vapor stream exiting second distillation column 660 can enter cooling pass 684 of third heat exchanger 652, wherein the stream can be cooled and at least partially condensed using air, water, or other suitable coolant. The resulting condensed or two-phase stream can then be routed through conduit 624 to a reflux accumulator 664, wherein the stream can be separated into a vapor and liquid phase.

Turning now to FIG. 3, another embodiment of a heavies removal zone suitable for integration with the LNG facility depicted in FIG. 1 is illustrated. The heavies removal zone depicted in FIG. 3 generally comprises: a first distillation column 650, a first heat exchanger or reboiler 654, a feed separator 644, an expansion device 646, a second heat exchanger 750, a second distillation column 660, an optional vapor liquid separator 653, and a third heat exchanger 652. The streams exiting the LNG facility depicted in FIG. 1 and routed to the heavies removal zone are dependent upon the operating conditions of the heavies removal zone, i.e., the temperature, pressure, etc. Likewise, upon exiting the heavies removal zone several streams are reintroduced into the LNG facility depicted in FIG. 1 at an appropriate stage in the process as not to damage the equipment. In one embodiment, the streams returning to the LNG facility depicted in FIG. 1 are reintroduced through manual or automated sequencing valves to thereby deliver the incoming fluid to the appropriate stages within the equipment limitations.

In FIG. 3, the combined streams of conduits C and E can be introduced into a feed separator 644, wherein the vapor and liquid phases are separated thereby producing a vapor fraction and a liquid fraction. The vapor fraction is introduced into an expansion valve or expander 646 and subsequently introduced into the first distillation column 650 through conduit 601(b). The liquid fraction is introduced into the same or lower location of the first distillation column 650 through conduit 603. By utilizing the feed separator 644, the relatively heavier components contained within the liquid stream may be routed to a more optimal feed location to the first distillation column 650.

Referring to FIG. 3, the first distillation column 650 separates the incoming streams producing a first column vapor stream, and a first column liquid bottoms stream. The first column vapor stream can be withdrawn from the first distillation column 650 through conduit D and routed to the LNG facility as depicted in FIG. 1. The first column liquid bottoms stream can be withdrawn from a bottom outlet of first distillation column 650 and routed through conduit 602 to a second heat exchanger 750, discussed below.

Referring to FIG. 3, the first distillation column 650 can contain a chimney or trap-out tray (not shown), wherein column liquids are removed and directed through the third heat exchanger 652 to provide condensing or partial condensing duty before routing to an optional second vapor liquid separator 653. Liquid from the optional second vapor liquid separator 653 can be routed through conduit 604(b) to the cold side inlet of the first reboiler 654. Vapor from the optional vapor liquid separator 653 can be combined with vapor from the first reboiler 654 and returned to the first distillation column 650 above or below the chimney or trap-out tray. Liquid from the first reboiler 654 can be returned to the first distillation column or combined with the first column 650 liquid bottoms stream.

Referring now to FIG. 3, at least a portion of the natural gas stream withdrawn from conduit 116 in FIG. 1 can be routed to the heavies removal zones depicted in FIG. 3 through conduit A. As shown in FIG. 3, the stream in conduit A can enter the warm side inlet of the first reboiler 654 to provide reboiler heat duty to the first distillation column 650. The warm side outlet of the first reboiler 654 exits through conduit B and is returned to the LNG facility as shown in FIG. 1.

As shown in FIG. 1, a portion of the natural gas stream exiting a high-stage methane compressor through conduit 166 can be withdrawn through conduits H or F and can be routed to the heavies removal zones depicted in FIGS. 2 and 3. In an embodiment, the portion of the natural gas stream in conduits H or F in FIG. 1 is a methane compressor discharge stream. As shown in FIG. 3, the portion of the natural gas stream in conduits H or F can enter the warm side inlet of the second heat exchanger 750 to heat cold side inlet stream, which is the first column liquid bottoms stream in conduit 602, to thereby establish the cold side outlet stream in conduit 610 of the second heat exchanger 750 to the optimal or desired feed temperature for the second distillation column 660. The warm side outlet from the second heat exchanger 750 can be routed back to the LNG facility through conduit G.

Referring to FIG. 3, the second distillation column 660 separates the incoming stream in conduit 610 into a second column overhead vapor stream and second column liquid bottoms stream. The second column overhead vapor stream (also called "second overhead stream") is withdrawn through conduit 622 from second distillation column 660. A portion of the second column overhead vapor stream exiting second distillation column 660 can enter cooling pass 684 of the third heat exchanger 652, wherein the stream can be cooled and at least partially condensed. The resulting cooled and at least partially condensed stream can then be routed through conduit 624 to a first reflux accumulator 664, wherein the stream can be separated into vapor stream 630 and liquid stream 626.

Figure 4:
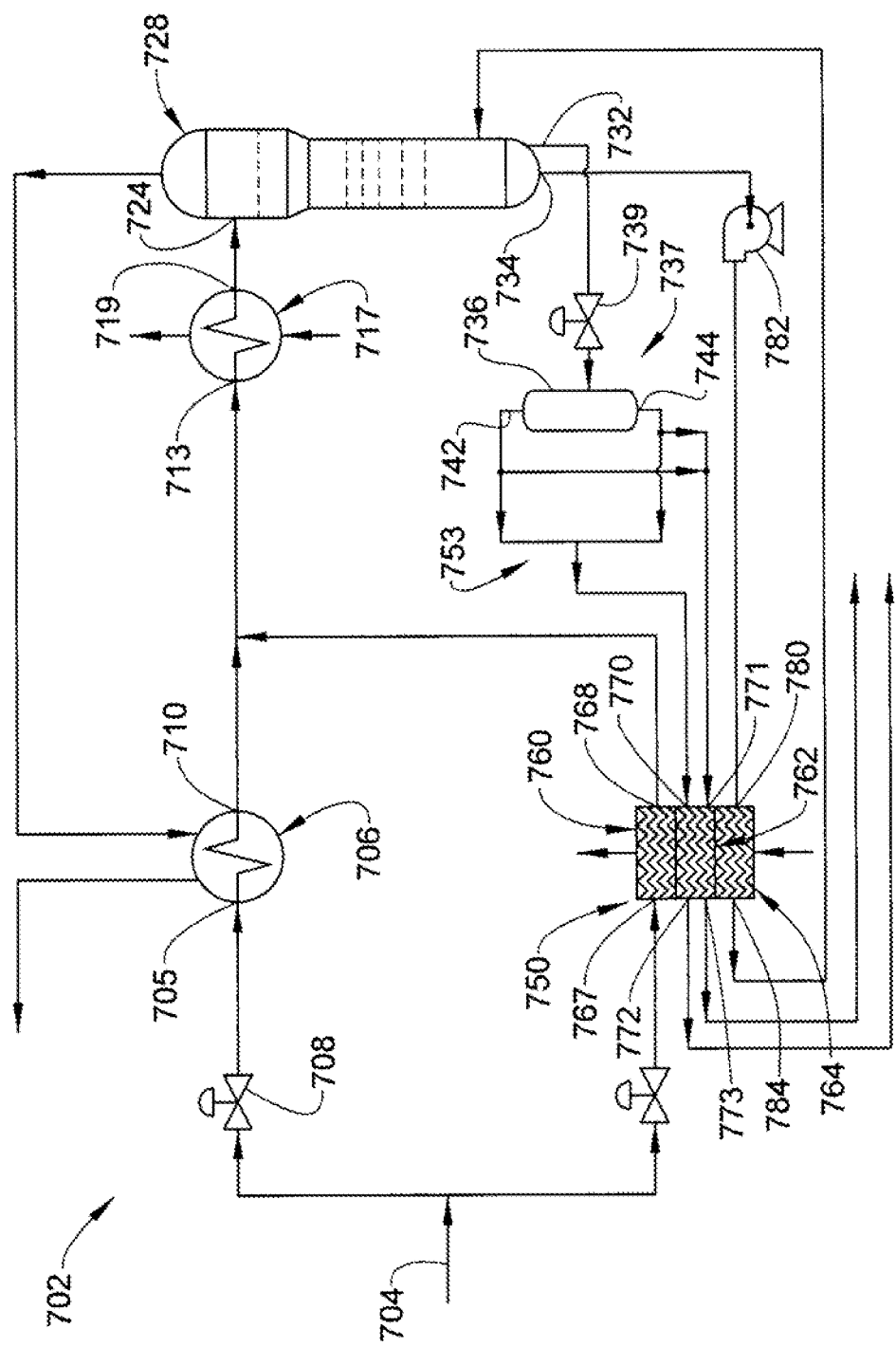
FIG. 4 depicts a schematic diagram of a portion of the cascade-type LNG facility including a plate fin heat exchanger formed from a nickel-iron alloy material, in accordance with an exemplary embodiment.

In accordance with an aspect of an exemplary embodiment, the LNG facility may include a cryogenic gas processing system, generally indicated at 702, in FIG. 4. Cryogenic gas processing system 702 includes a feed gas inlet 704 that is fluidically connected to an inlet 705 of a heat exchanger 706 through a valve 708. Heat exchanger 706 includes an outlet 710 that is fluidically connected to an inlet 713 of a chiller 717. Chiller 717 raises a temperature of a feed gas passing from heat exchanger 706 and includes an outlet 719 that is fluidically connected to an inlet 724 of a low temperature separator (LTS) 728. LTS 728 includes a first outlet 732 and a second outlet 734. First outlet 732 is fluidically connected to an inlet 736 of a flash drum 737 through a valve 739. Flash drum 737 includes a first outlet 742 and a second outlet 744. First and second outlets 742 and 744 are fluidically connected to second heat exchanger 750 through a plurality of conduits 753.

Second heat exchanger 750 includes a first section 760 fluidically connected to chiller 717, a second section 762 fluidically connected to flash drum 737, and a third section 764 fluidically connected to LTS 728. More specifically, first section 760 includes an inlet 767 fluidically connected to feed gas inlet 704 through a valve (not separately labeled) and an outlet 768 fluidically connected to inlet 713 of chiller 717. Second section 762 includes a first inlet 770 and a second inlet 771 fluidically connected to flash drum 737. Second section 762 also includes a first outlet 772 and a second outlet 773 fluidically connected to another process component (not shown). Third section 764 includes an inlet 780 fluidically connected to LTS 728 through a pump 782 and an outlet 784 fluidically connected to another process component (also not shown).

Figure 5:
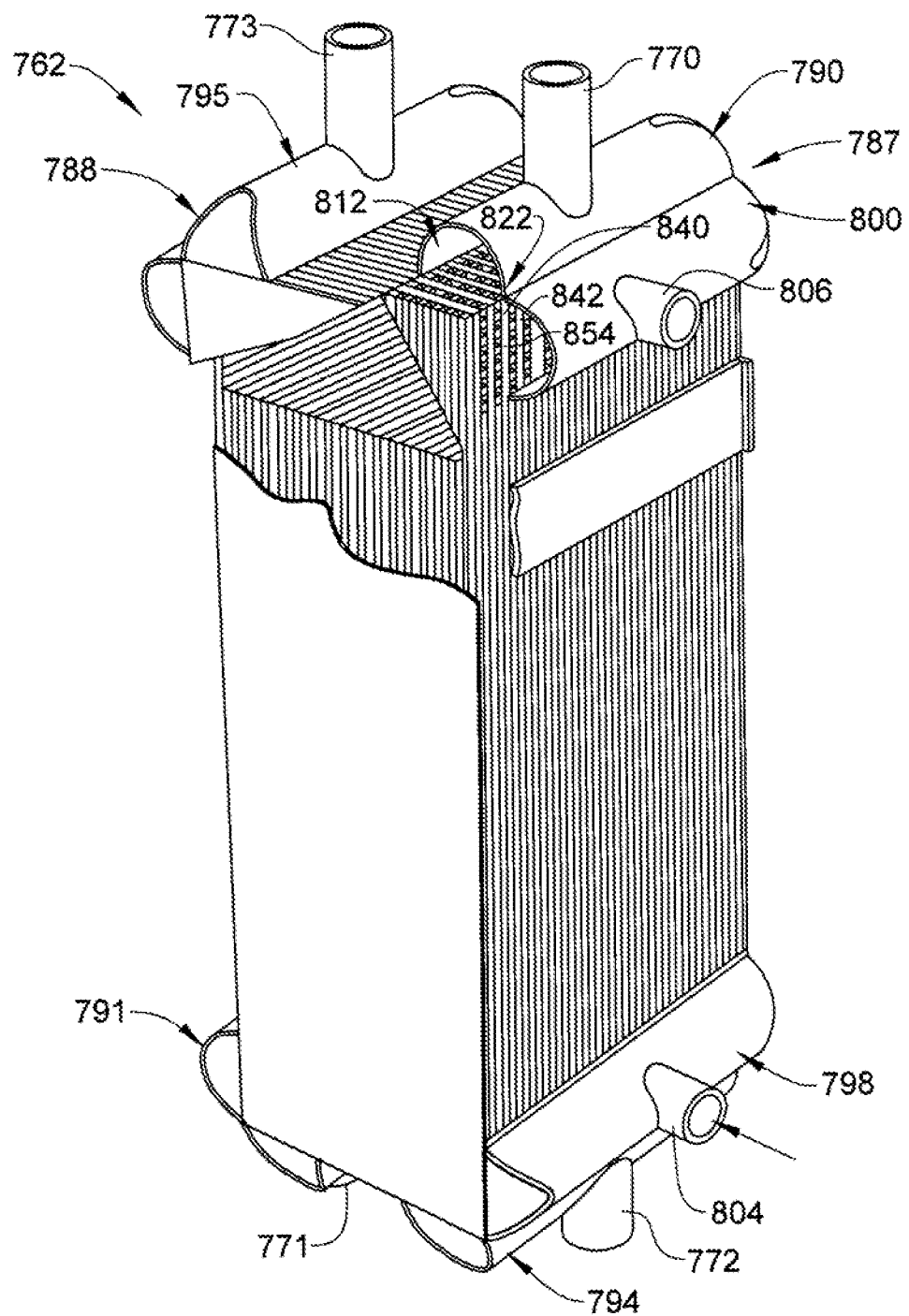
FIG. 5 is a partially cut-away perspective view of the plate fin heat exchanger formed from the nickel-iron alloy material of FIG. 4.

Reference will now follow to FIG. 5 in describing second section 762 with an understanding that first section 760 and third section 764 may include similar structure. Second section 762 includes a first heat exchange portion 787 and a second heat exchange portion 788. First heat exchange portion 787 includes a first inlet plenum 790 fluidically connected to first inlet 770, and second heat exchange portion 788 includes a second inlet plenum 791 fluidically connected to second inlet 771. First heat exchange portion 787 also includes a first outlet plenum 794 fluidically connected to first outlet 772, and second heat exchange portion 788 includes a second outlet plenum 795 fluidically connected to second outlet 773. First and second heat exchange portions 787 and 788 may receive cryogenic fluids and/or gases at similar temperatures or may receive cryogenic gases at different temperatures. Second section 762 also includes a conditioning flow inlet plenum 798 and a conditioning flow outlet plenum 800. Conditioning flow inlet plenum 798 includes a conditioning flow inlet 804, and conditioning flow outlet plenum 800 includes a conditioning flow outlet 806. Conditioning flow inlet plenum 798 receives a flow of conditioning fluid that is passed over layers 812 that form second section 762. The conditioning fluid exchanges heat with a cryogenic gas passing through layers 812.

Figure 6:
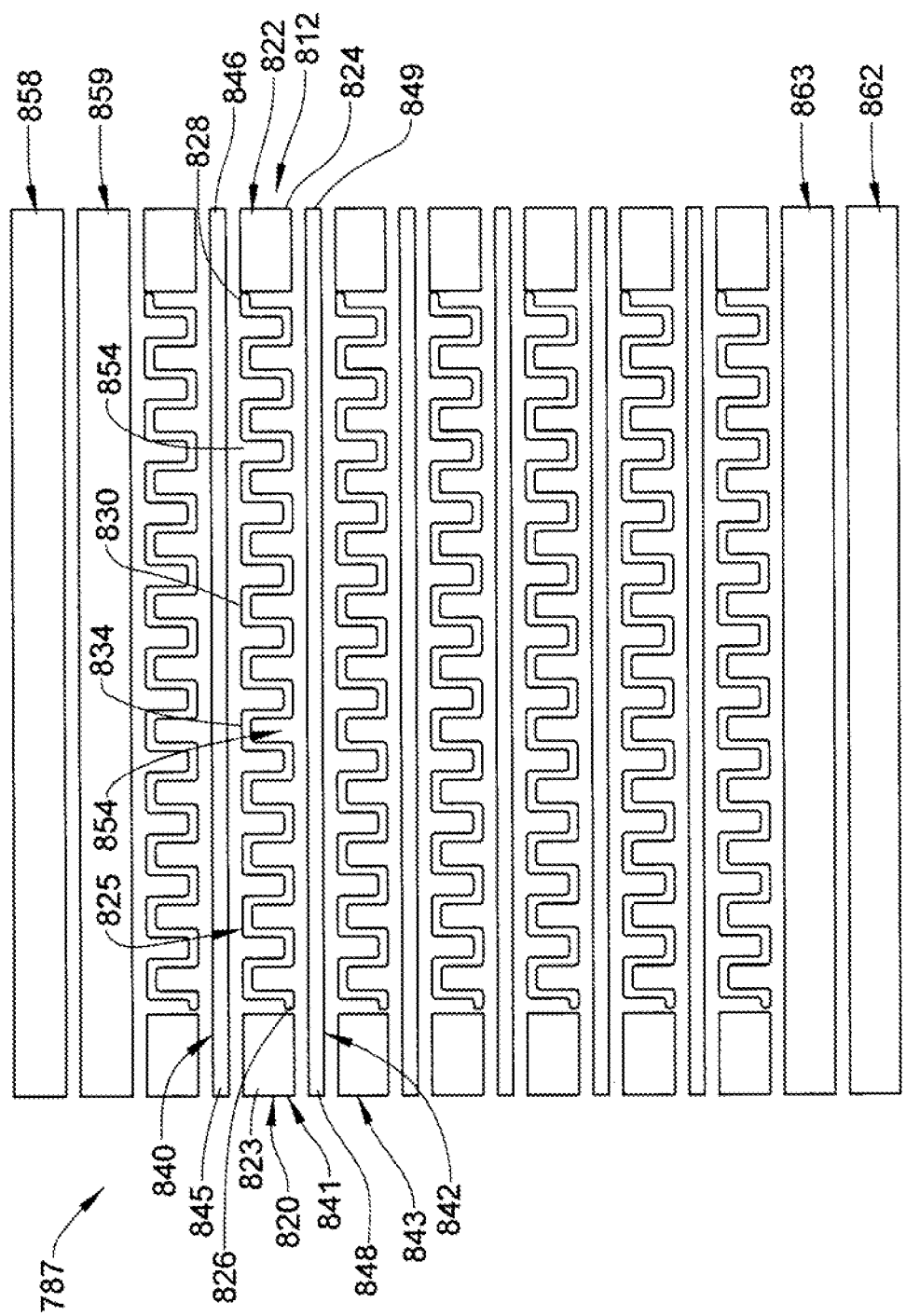
FIG. 6 depicts a disassembled view illustrating various components of the plate fin heat exchanger of FIG. 5.
Figure 7:
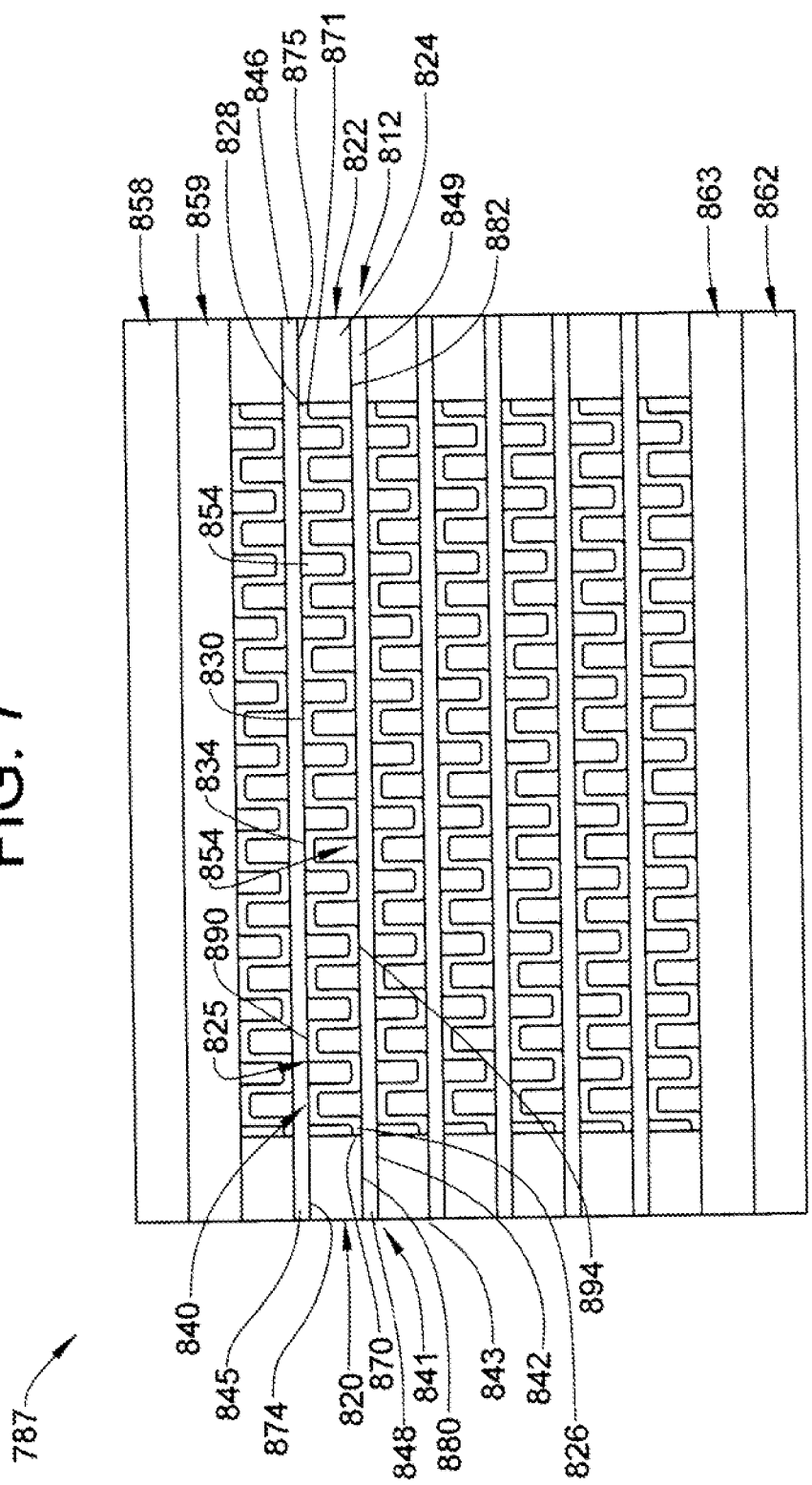
FIG. 7 depicts an assembled view of the plate fin heat exchanger of FIG. 6.

As best shown in FIGS. 6 and 7, each layer 812 includes a first side bar 820 and a second side bar 822. In the exemplary embodiment shown, first and second side bars 820 and 822 take the form of first and second spacers 823 and 824. It should however be understood, that first and second side bars 820 and 822 may take on other forms such as fluid plenums, support structures, and the like. A fin element 825 extends between first and second side bars 820 and 822. Fin element 825 extends from a first end 826 to a second end 828 through an intermediate portion 830. Intermediate portion 830 includes an inner passage 834 and is formed with a number of bend portions (not separately labeled) that may include a wide array of geometric patterns. Intermediate portion 830 provides an enhanced surface area of fin element 825 to increase heat transfer with the conditioning fluid.

A first parting sheet 840 extends between first and second side bars 820 and 822 on a first side (not separately labeled) of fin element 825 to form a first layer 841. A second parting sheet 842, which is part of a second layer 843, extends between first and second side bars 820 and 822 on a second, opposing side of fin element 825. First parting sheet 840 extends from a first end section 845 to a second end section 846. Similarly, second parting sheet 842 extends from a first end section 848 to a second end section 849. First and second side bars 820 and 822 and first and second parting sheets 840 and 842 define a conditioning fluid passage 854 along which extends fin element 825. As will be discussed more fully below, first and second side bars 820 and 822, parting sheets 840 and 842 and fin element 825 are joined, together with second layer 843, as well as additional layers 812, to form second section 762. Once joined, first and second end plates 858 and 859 are secured to a first side (not separately labeled) of second section 762 and third and fourth end plates 862 and 863 are joined to a second side (also not separately labeled) of second section 762.

In accordance with an exemplary embodiment, second heat exchanger 750 is formed from a nickel-iron alloy. In accordance with an aspect of the exemplary embodiment, the nickel-iron alloy includes a nickel content of between about 32% and about 42%. In accordance with another aspect of the exemplary embodiment, the nickel-iron alloy includes an iron content between about 34% and about 38%. In accordance with yet another aspect of the exemplary embodiment, the nickel-iron alloy includes an iron content of about 36% such as Invar®. More specifically, each of first and second side bars 820 and 822, fin element 825, and first parting sheet 840 are formed from the nickel-iron alloy. End plates 858, 859, 862 and 863 may also be formed from the nickel-iron alloy.

In further accordance with an exemplary embodiment, first side bar 820 is joined to first end 826 of fin element 825 through a first nickel-iron alloy bond 870 and second side bar 822 is joined to second end 828 of fin element 825 through a second nickel-iron alloy bond 871. Also, first end section 845 of first parting sheet 840 is joined to first side bar 820 through a third nickel-iron alloy bond 874 while second end section 846 is joined to second side bar 822 through a fourth nickel-iron alloy bond 875. Similarly, first end section 848 of second parting sheet 842 is joined to first side bar 820 through a fifth nickel-iron alloy bond 880 and second end section 849 is joined to second side bar 822 through a sixth nickel-iron alloy bond 881. Further, fin element 825 may be joined to first and second parting sheets 840 and 842 through corresponding first and second pluralities of nickel-iron alloy bonds, indicated generally at 890 and 894. Each nickel-iron alloy bond 870, 871, 874, 875, 880, 881, 890 and 894 may take the form of diffusion bonds in which atoms from each component being joined are shared with the other of the components being joined. Each nickel-iron alloy bond 870, 871, 874, 875, 880, 881, 890 and 894 may also take the form of a joint that is formed through the application of additional nickel-iron alloy material.

At this point it should be understood that 5000-series aluminum alloys commonly used in brazed aluminum heat exchangers can be damaged if exposed to mercury concentration in excess of 0.01 micrograms per normal meter cubed (μg/Nm3). The use of nickel-iron alloys enables heat exchanger to receive cryogenic gases having a mercury content of greater than 0.01 μg/Nm3 without fear of liquid metal embrittlement failure or mercury amalgamation which plague heat exchangers typically constructed of 5000-series aluminum alloys. Further, it should be understood that the use of a nickel-iron alloy to construct heat exchanger achieves a stronger, more fatigue-resistant unit having a lower coefficient of thermal expansion than that provided by aluminum. The lower coefficient of thermal expansion greatly increases design allowances for adjacent stream temperature differentials, greatly increases design allowances for temperature rate of change, elevates the maximum temperature and differential temperature limitations, and allows higher nozzle and piping loads. Further benefits from the use of a nickel-iron alloy include the elimination of, or reduction in cost of, expensive transition joints. Further, the use of nickel-iron alloy allows for a reduction in piping length requirements, a reduced probability of plant shutdown do to leaks, cracks and other issues commonly associated with aluminum heat exchangers, and shorter defrost and start up times.

Figure 8:
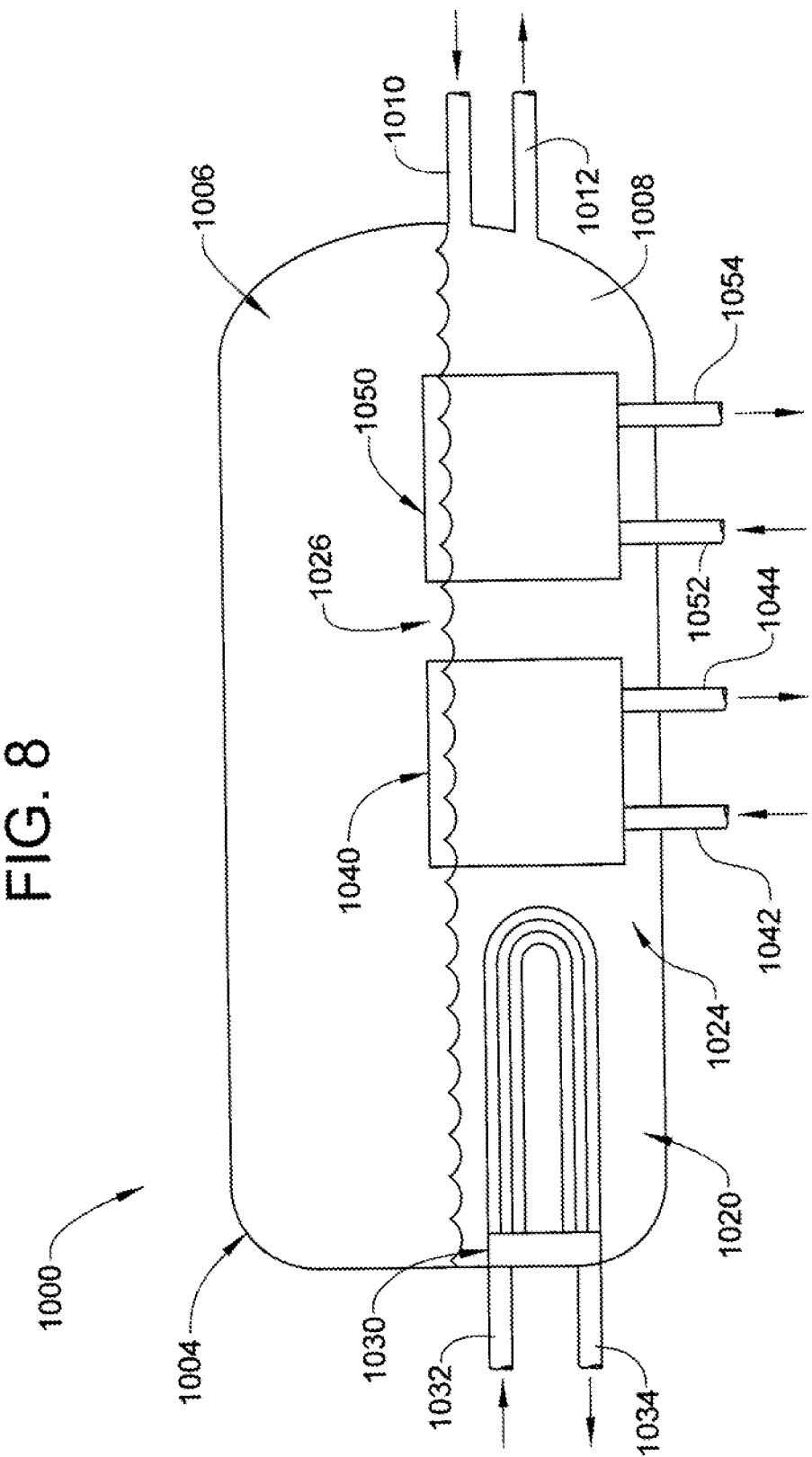
FIG. 8 depicts a hybrid core-in-shell heat exchanger, in accordance with yet another aspect of an exemplary embodiment.

In accordance with another aspect of an exemplary embodiment, the LNG production facility may include a hybrid core-in-shell heat exchanger illustrated generally at 1000 in FIG. 8. Hybrid core-in-shell heat exchanger 1000 may take the place of chillers 33B, 34 and 35 or may be employed in other systems of the LNG production facility as will become evident below. Hybrid core-in-shell heat exchanger 1000 includes a vessel 1004 having an interior portion 1006 that is provided with a refrigerant 1008. Refrigerant 1008 is introduced into vessel 1004 through a refrigerant inlet 1010 and passed from vessel 1004 through a refrigerant outlet 1012. The particular form of refrigerant employed in vessel 1004 may vary.

In further accordance with an exemplary embodiment, hybrid core-in-shell heat exchanger 1000 includes a first exchanger 1020, a second exchanger 1024, and a third exchanger 1026. First exchanger 1020 is shown in the form of a tube bundle exchanger 1030 having an inlet 1032 and an outlet 1034. Second exchanger 1024 may take the form of a printed circuit heat exchanger (PCHE) 1040 having an inlet 1042 and an outlet 1044. Third exchanger 1026 may take the form of a brazed aluminum heat exchanger (BAHX)

1050 having an inlet 1052 and an outlet 1054. Exchangers 1024 and 1026 include sections (not separately labeled) that extend above refrigerant 1008 by as much as 4-inches (10.1-cm) or more. Exchangers 1020, 1024 and 1026 are fluidically isolated from one another yet are in a heat exchange relationship with refrigerant 1008. While described as being three-distinct exchanger configurations, it should be understood that hybrid core-in-shell heat exchanger 1000 may include exchangers having two or more exchanger configurations. Further, while shown as including three exchangers, the number of exchangers may vary.

The use of different exchanger configurations allows for different streams having different properties to be passed through a single refrigerant pool. That is, in LNG production, streams may include different parameters including temperature, pressure, contaminants, such as mercury content and the like, that may not all be compatable with a single exchanger configuration. The use of various exchanger configurations would improve thermal transfer efficiencies for streams compatable with more efficient heat exchange configurations such as PCHE and BAHX while also allowing non-compatible streams, e.g., streams containing amounts of mercury that exceed desirable levels or are at pressures and temperatures that are less compatible with PCHE and BAHX technology to pass through the same vessel. In this manner, the hybrid-core-in-shell heat exchanger will improve overall facility efficiency as well as reduce component costs, maintenance costs, installation costs, and real estate footprint costs associated with the use of multiple heat exchangers currently needed to accommodate the various streams in an LNG production facility.

In one embodiment of the present invention, the LNG production systems can be simulated on a computer using process simulation software in order to generate process simulation data in a human-readable form. In one embodiment, the process simulation data can be in the form of a computer printout. In another embodiment, the process simulation data can be displayed on a screen, a monitor, or other viewing device. The simulation data can then be used to manipulate the operation of the LNG system and/or design the physical layout of an LNG facility. In one embodiment, the simulation results can be used to design a new LNG facility and/or revamp or expand an existing facility. In another embodiment, the simulation results can be used to optimize the LNG facility according to one or more operating parameters. Examples of suitable software for producing the simulation results include HYSYS™ or Aspen Plus® from Aspen Technology, Inc., and PRO/II® from Simulation Sciences Inc.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A cryogenic gas processing system comprising:
    a chiller;
    a low temperature separator (LTS) including an inlet fluidically connected to the chiller, a first outlet and a second outlet;
    a flash drum including an inlet fluidically connected to the LTS and a plurality of conduits;
    a heat exchanger fluidically connected to the second outlet of the LTS and the plurality of conduits of the flash drum, the heat exchanger comprising:
        a first side bar formed from a nickel-iron alloy;
        a second side bar formed from the nickel-iron alloy, the second side bar being spaced from the first side bar;
        a fin element formed from the nickel-iron alloy extending between the first side bar and the second side bar forming a first layer of the heat exchanger, the fin element including an inner passage, thereby defining a fluid passage, the fin element formed from the nickel-iron alloy;
        a first nickel-iron alloy bond joining the fin element and the first side bar; and
        a second nickel-iron alloy bond joining the fin element and the second side bar,
        wherein the nickel content of the nickel-iron alloy is between about 32% and 42%; and
    a pump disposed between the heat exchanger and the second outlet of the LTS to convey an outlet fluid from the second outlet of the LTS directly into the heat exchanger.

2. The cryogenic gas processing system according to claim 1, further comprising: a parting sheet extending between, and connected to, the first side bar and the second side bar, the parting sheet being formed from the nickel-iron alloy.

3. The cryogenic gas processing system according to claim 2, wherein the parting sheet is joined to each of the first and second side bars through a corresponding nickel-iron alloy bond.

4. The cryogenic gas processing system according to claim 3, wherein the corresponding nickel-iron alloy bond comprises a diffusion bond.

5. The cryogenic gas processing system according to claim 1, wherein each of the first nickel-iron alloy bond and the second nickel-iron alloy bond comprises a diffusion bond.

6. The cryogenic gas processing system according to claim 1, wherein the heat exchanger includes a first portion connected to a second portion, the first portion including a first inlet plenum configured and disposed to receive a first cryogenic fluid and the second portion including a second inlet plenum configured and disposed to receive a second cryogenic fluid.

7. A heat exchanger comprising:
    a first side bar formed from a nickel-iron alloy, wherein the nickel content of the nickel-iron alloy is between about 32% and 42%;
    a second side bar formed from the nickel-iron alloy, the second side bar being spaced from the first side bar;
    a fin element formed from the nickel-iron alloy extending between the first side bar and the second side bar forming a first layer of the heat exchanger, the fin element including an inner passage, thereby defining a fluid passage, the fin element formed from the nickel-iron alloy;

a first nickel-iron alloy bond joining the fin element and the first side bar; and a second nickel-iron alloy bond joining the fin element and the second side bar; and a fluid inlet fluidically connected directly to an outlet of a low temperature separator via a pump.

8. The heat exchanger according to claim 6, further comprising: a parting sheet extending between, and connected to, the first side bar and the second side bar, the parting sheet being formed from the nickel-iron alloy.

9. The heat exchanger according to claim 8, wherein the parting sheet is joined to each of the first and second side bars through a corresponding nickel-iron alloy bond.

10. The heat exchanger according to claim 9, wherein the corresponding nickel-iron alloy bond comprises a diffusion bond.

11. The heat exchanger according to claim 7, wherein each of the first nickel-iron alloy bond and the second nickel-iron alloy bond comprises a diffusion bond.

12. The heat exchanger according to claim 7, further comprising: a first heat exchange portion connected to a second heat exchange portion, the first heat exchange portion including a first inlet plenum configured and disposed to receive a first cryogenic fluid and the second heat exchange portion including a second inlet plenum configured and disposed to receive a second cryogenic fluid.

13. The heat exchanger according to claim 7, further comprising: a conditioning flow inlet plenum having a conditioning flow inlet and a conditioning flow outlet plenum having a conditioning flow outlet, the conditioning flow inlet plenum being configured and disposed to direct a cryogenic fluid across the fin element formed from the nickel-iron alloy.

14. The cryogenic gas processing system according to claim 1, wherein the iron content of the nickel-iron alloy is between about 34% and 38%.

15. The cryogenic gas processing system according to claim 1, wherein each of the first nickel-iron alloy bond and the second nickel-iron alloy bond comprises application of additional nickel-iron alloy material.

16. The cryogenic gas processing system according to claim 3, wherein the corresponding nickel-iron alloy bond comprises application of additional nickel-iron alloy material.

17. The heat exchanger according to claim 7, wherein the iron content of the nickel-iron alloy is between about 34% and 38%.

18. The heat exchanger according to claim 7, wherein each of the first nickel-iron alloy bond and the second nickel-iron alloy bond comprises application of additional nickel-iron alloy material.

19. The heat exchanger according to claim 9, wherein the corresponding nickel-iron alloy bond comprises application of additional nickel-iron alloy material.

20. A cryogenic gas processing system comprising:

a chiller;

a low temperature separator (LTS) including an inlet fluidically connected to the chiller, a first outlet and a second outlet;

a flash drum including an inlet fluidically connected to the LTS and a plurality of outlet conduits;

a heat exchanger fluidically connected to the second outlet of the LTS and the plurality of outlet conduits of the flash drum, the heat exchanger comprising:

a first side bar formed from a nickel-iron alloy;

a second side bar formed from the nickel-iron alloy, the second side bar being spaced from the first side bar;

a fin element formed from the nickel-iron alloy extending between the first side bar and the second side bar forming a first layer of the heat exchanger, the fin element including an inner passage defining a fluid passage; and a pump disposed between the heat exchanger and the second outlet of the LTS to convey an outlet fluid from the second outlet of the LTS directly into the heat exchanger.

* * * * *